United States Patent [19]
Banda et al.

[11] Patent Number: 5,410,685
[45] Date of Patent: Apr. 25, 1995

[54] NON-INTRINSIVE METHOD AND SYSTEM FOR RECOVERING THE STATE OF A COMPUTER SYSTEM AND NON-INTRUSIVE DEBUGGING METHOD AND SYSTEM UTILIZING SAME

[75] Inventors: Venu Prabhakar Banda; Richard A. Volz, both of College Station, Tex.

[73] Assignee: Regents of the University of Michigan, Ann Arbor, Mich.

[21] Appl. No.: 86,224

[22] Filed: Jul. 1, 1993

Related U.S. Application Data

[63] Continuation of Ser. No. 536,977, Jun. 12, 1990, abandoned.

[51] Int. Cl.⁶ .............................................. G06F 9/45
[52] U.S. Cl. ...................................... 395/575; 371/19
[58] Field of Search ......................... 395/575; 371/19; 364/200, DIG. 1, 267.91

[56] References Cited

U.S. PATENT DOCUMENTS

| | | | |
|---|---|---|---|
| 4,164,017 | 8/1979 | Randell et al. | 395/575 |
| 5,086,502 | 2/1992 | Malcolm | 395/575 |
| 5,089,958 | 2/1992 | Horton et al. | 395/575 |
| 5,103,394 | 4/1992 | Blasciak | 395/575 |
| 5,142,679 | 8/1992 | Owak et al. | 395/700 |

*Primary Examiner*—Robert W. Beausoliel, Jr.
*Assistant Examiner*—Ly V. Hua
*Attorney, Agent, or Firm*—Brooks & Kushman

[57] ABSTRACT

A non-intrusive method and system for recovering the state of a computer system including a memory having first and second matched levels. The first level is connected to a target processor and the second level is connected to a checkpoint processor which is also connected to the target processor. In an example of the invention, a two phase, non-intrusive method and system for debugging parallel computer programs is provided. The program has checkpoint instructions therein. In the first phase the execution of the program is monitored non-intrusively from a bus connecting the target processor to the first level of memory. A sequence of relevant program instructions is stored in an event table. Upon encountering a checkpoint instruction, the target processor cues the checkpoint processor to initiate a non-intrusive checkpointing strategy utilizing the two-level memory with an E-bit scheme. In the second phase the information collected during the first phase is utilized to replay an identical execution of the program, in a simulated environment. A user, on encountering an error, can back up to a previous checkpoint and replay the program from that state of the computer system.

6 Claims, 5 Drawing Sheets

A : ADDRESS

D : DATA

E : ENABLE-BIT

NON-INTRINSIVE METHOD AND SYSTEM FOR RECOVERING THE STATE OF A COMPUTER SYSTEM AND NON-INTRUSIVE DEBUGGING METHOD AND SYSTEM UTILIZING SAME

This is a continuation of application Ser. No 07/536,977, filed on Jun. 12, 1990, now abandoned.

TECHNICAL FIELD

This invention relates to non-intrusive methods and systems for recovering the state of a computer system for use, for example, in the non-intrusive debugging of software.

BACKGROUND ART

There are a number of applications in which it is required to roll back the state of a computer system. For example, fault-tolerant applications require a fast recovery from failure. Debugging software requires such a roll back but does not require the roll back to be on-line. However, there is a need to keep the debugging non-intrusive.

Other applications requiring the state of a computer system to be rolled back include (1) implementing atomic transactions in databases and (2) implementing an "UNDO" facility at the programming language level.

Debugging parallel computer programs is difficult for a number of reasons. First, it is difficult to understand program behavior since there are multiple threads of control active at any given instant of time. Second, because the scheduling of control between these multiple threads is non-deterministic the behavior of a parallel program A cross successive executions may be different. Third, simple methods of monitoring programs by introducing monitoring statements are inadequate because they may perturb the behavior of the program they intend to monitor and thereby mask or unmask timing errors inherent in the program. This third point is generally also referred to as the Heisenbug Uncertainty Principle and is often stated as follows:

Measuring the program state, perturbs the state; and the degree of perturbation is proportional to the fraction of the state that is captured i.e., the greater the volume of information collected, the lower the accuracy.

The problems with debugging parallel programs have been known for sometime. However, little has been done to solve this problem, largely because a complete solution requires a coordinated and concerted effort that involves both hardware and software. Most, or nearly all, of the approaches developed to date are based principally on software and suffer from the Heisenbug Uncertainty Principle. Therefore, all such approaches are fundamentally weak in that they do not achieve zero perturbation and therefore may not detect certain severe time critical errors.

The Bell System 1-A was one of the first full scale non-interfering debuggers. The System 1-A was developed by Bell Laboratories for their electronic switching system application. Non-interference was achieved through circuit duplication. The Bell System 1-A provides debugging capability at varying degrees of interference (interfering, moderately interfering and non-interfering). The hardware monitoring was achieved by a programmable device called UTC (Utility Test Console). The UTC consisted of circuitry to detect the occurrence of an address or data or any arbitrary bit pattern within the data. Each of these low level events triggered an action which could be to start or stop a trace or interrupt the computer.

The System 1-A was a pioneering effort in non-intrusive debugging. However, its main drawback was that it was a single phase debugger and did not allow the programmer to replay the program. To identify an error, the programmer has to peruse through voluminous monitoring data. Since the programmer did not get an opportunity to replay the program, he/she had to carefully plan what to monitor the first time around. In a sense, therefore, it required the programmer to know the nature of the error before the start of the debugging session. Other approaches also suffered from similar problems.

Significant among the other approaches are the replay based techniques disclosed in T. J. LeBlac and John M. Mellor-Crummey, "Debugging Parallel Programs with Instant Replay," *IEEE Transactions on Computers*, pages 471–482, Apr. 1987 and Chiu's debugger for atomic transaction system as described at Y. S. Chiu, "*Debugging Distributed Computations in a Nested Atomic Action System*", PhD thesis, laboratory for Computer Science, MIT, 1984. All these approaches however interfere with the target program. Other approaches also involve reversible execution systems where the programmer is allowed to roll back the program to a previous state. Again, these approaches interfere with the target program.

In summary, the literature is scarce when it comes to debugging real-time programs (where it is not only important to compute the right value but to do so within strict time constraints). There are certain errors in real-time programs that don't occur in non-real-time programs.

A real-time application is one in which the correctness of a program is not solely defined by the value of the output that is computed, but also by the time at which such a value is computed. A correctly computed value that is not done so within a certain time limit is considered as erroneous. In certain applications, meeting time deadlines is so important that an incorrect value computed within a certain deadline is acceptable while a correct computation that misses the deadline is not.

Since meeting deadlines is so crucial in real-time systems, it is necessary to schedule the processes appropriately to meet the timing constraints. Scheduling, therefore, is an integral part of a real-time program. An incorrect schedule could lead to a missed deadline.

Scheduling errors are typical of real-time programs, where, missing a dealing is perceived as an error. These errors are also not reproducible but the reasons for their irreproducibility is not just limited to relative progress of the constituent processes. The following are some of the situations during which a scheduling error may occur:

(1) Incorrect Scheduling: Usually in time-critical programs where meeting the deadlines is of utmost importance, the program manages the scheduling of control between its processes. An incorrect task schedule, for example, could result in a deadline being missed. Even though the program explicitly manages the scheduling, the exact schedule need not be the same during each re-execution because of asynchronous events like interrupts. As a result, the deadline could be missed sometimes and not at others.

(2) Unpredictable Timing: Sometimes, however, a deadline may be missed even though the schedule was correct. For example, a deadline may be missed in spite of a correct task and instruction schedule, because an instruction or a set of instructions took more time than anticipated.

A machine instruction i, executed during a particular run of the target program P, is said to be interfering or intrusive with the execution of P, if any of the following are satisfied:

- i is a temporary instruction (introduced solely for debugging or testing purposes) within the target program and will be removed before the final version of the program is released.
- i is a part of a debugger and is executed on the same processor as the genuine instructions (those contributing to the computation) of the target program.
- i is a part of the debugger and is not executed on the same processor as the genuine instructions of the target program, but i consumes a non-zero number of bus cycles from the target processor.

The bus-cycle condition emphasizes the fact that having an auxiliary processor on which the debugger runs, does not in itself, guarantee non-intrusiveness. For example, if the auxiliary processor shares the same memory as the target processor, then instructions executed on it will steal some cycles from the target processor to access the memory and will therefore contribute to the interference.

According to the above definition, an instruction i left permanently within the target program is not considered as interfering.

SUMMARY OF THE INVENTION

An object of the present invention is to provide a non-intrusive method and system for recovering the state of a computer system in a simple fashion for use, for example, in a debugging method and system wherein a debugged program is replayed if an error occurs.

Another object of the present invention is to provide a non-intrusive method and system for recovering the state of a computer system quickly and simply, for use, for example, in a fault-tolerant application.

In carrying out the above objects and other objects of the present invention a method is provided for recovering the state of a computer system. The computer system includes a target processor programmed with a target program having a plurality of instruction blocks, each of the blocks having at least one variable associated therewith. The system also includes a memory having first and second levels, each of the levels having a plurality of locations, the first level of memory being connected to the target processor. The method includes the step of storing a first value of the at least one variable in a first location of the first level of memory, and generating a first signal indicating the beginning of an instruction block or checkpoint frame. The method also includes the step of storing a second value of the at least one variable in the first location of the first level of memory, the second value being different from the first value. The method finally includes the step transferring the first value of the at least one variable to a corresponding location in the second level based on the first signal. The first and second locations of the first and second levels of memory, respectively, define a push down stack having a push down mode and a locked mode. The first value is transferred to the second location in the push down mode. The stack prevents any change in the first value of the at least one variable in the second location of the second level after the step of transferring in the locked mode during the execution of the instruction block. The value of the at least one variable is allowed to change in the first location of the first level during execution of the instruction block. The first value of the at least one variable contained in the second location of the second level is utilized for recovering the state of the computer system to that at the beginning of the instruction block/checkpoint frame.

Further in carrying out the above objects and other objects of the present invention, a method for debugging a target program written in the form of a plurality of parallel processes in a computer system is provided. The computer system includes at least one processor programmed with the target program. The program has a plurality of instruction blocks and at least one checkpoint instruction therein, each of the blocks having at least one variable associated therewith. The computer system also includes a common global memory having first and second levels, each of the levels having a plurality of locations and a bus connecting the first level of memory to the processor. The method includes the steps of: executing the processes according to predetermined schedule; non-intrusively monitoring the execution of the target program from the bus; storing a sequence of relevant program instructions based on the step of monitoring; generating a first signal based on the execution of the at least one checkpoint instruction; and non-intrusively checkpointing the target program based on the first signal to obtain checkpoint information. The method further includes the steps of recovering the state of the computer system, upon encountering an error during the step of executing, to the at least one checkpoint instruction based on the checkpoint information; and replaying the target program based on the sequence of relevant program instructions to debug the target program from the checkpoint instruction.

Also provided are systems for carrying out each of the above methods.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
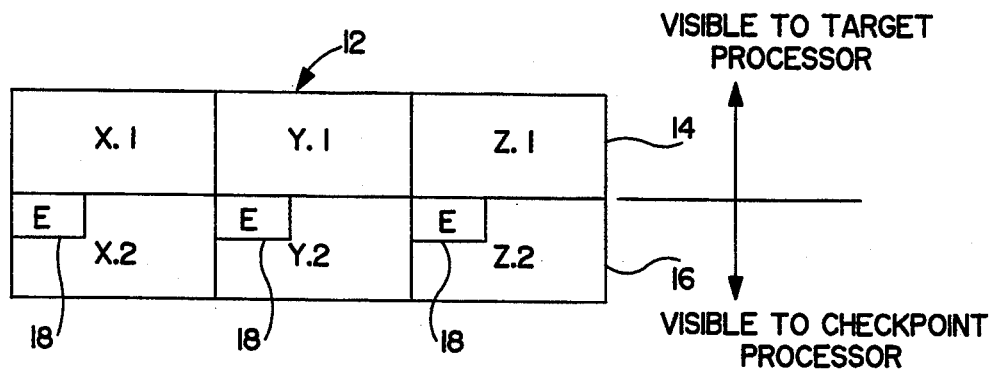
FIG. 1 is a schematic diagram of a two-level memory for use in the method and system of the present invention.

Referring now to the drawing figures, there is illustrated a method and system for recovering the state of a computer system. The method and system utilize memory hardware that keeps track of history information of the computer system. The method and system implements a block-level roll-back. The delineation of a block is done by a target program running on a processor 10 by the use of a special instruction (CHKPT instruction). When a CHKPT instruction is executed, the target processor 10 informs a memory, generally indicated at 12, of the beginning of a block. The memory 12 then begins to maintain history information for this block.

The method and system keep track of the first change to each variable within a block in order to implement the block-level roll-back. More specifically, if a location L had value $v_o$ at the beginning of the block and was subsequently updated numerous times within the block, then, to restore the value of L to that at the beginning of the block it suffices to capture its value at the beginning of the block (namely $v_o$). Maintaining a history of the intermediate values of location L is not required because the granularity of roll-back is a whole block.

The method and system utilize the memory 12 as shown in FIG. 1. The memory 12 is organized into two distinct layers or levels 14 and 16. Every location in memory 12 is duplicated. Every location in the top layer 14 has a corresponding location in the bottom layer 16. A location in the bottom layer 16 maintains the history of the location corresponding to it in the top layer 14. For example, "X.2" contains some previous value of location "X.1". As discussed above, there is a need to maintain only one level of history (namely, the value of a location at the beginning of a block) in order to roll-back location L by a block. Therefore, "X.2" reflects the value of the corresponding location in the top layer 14 when the block was entered.

Each element (i.e. the tuple consisting of a location from the top layer 14 and the corresponding one from the bottom layer 16) is considered as a stack. Whenever an enabled location in the top layer is written into, the old value in the top layer 14 is pushed to the corresponding location in the bottom layer 16 and the new value is written into the location in the top layer 14. The old value in the bottom layer 16 is lost. The stack action is controlled by an enable bit, E-bit 18, that is associated with every element in the memory 12. If the E-bit 18 is 0, the element operates like a stack as described above. If the E-bit 18 is 1, then any attempt to write to the top layer 14, modifies only the top location and does not effect the bottom location. This simple memory architecture is powerful for recovering/roll-back applications.

The E-bit described above, is set whenever the target program enters a new block (through the CHKPT instruction). The target processor 10 informs the memory 12 that it is entering a new block (through a line on an interconnecting bus, as discussed below). On receiving the signal from the target processor 10, the memory 12 does the following:

Sets all E-bits 18 to 0. When E is 0, the memory 12 acts like a stack, as explained above.

On the first pushdown, after a CHKPT instruction (i.e., after the first write into a location after a checkpoint) the E-bit 18 of the corresponding location is set to 1, having the effect of locking out the bottom location after the pushdown. The bottom location of the corresponding stack now contains a value that can be used to roll-back this location by a block.

The E-bit 18 indicates which locations in memory 12 have been changed since the current block entered. A roll-back can therefore be accomplished by reverse pushing all locations whose E-bits 18 are set.

Figure 2:
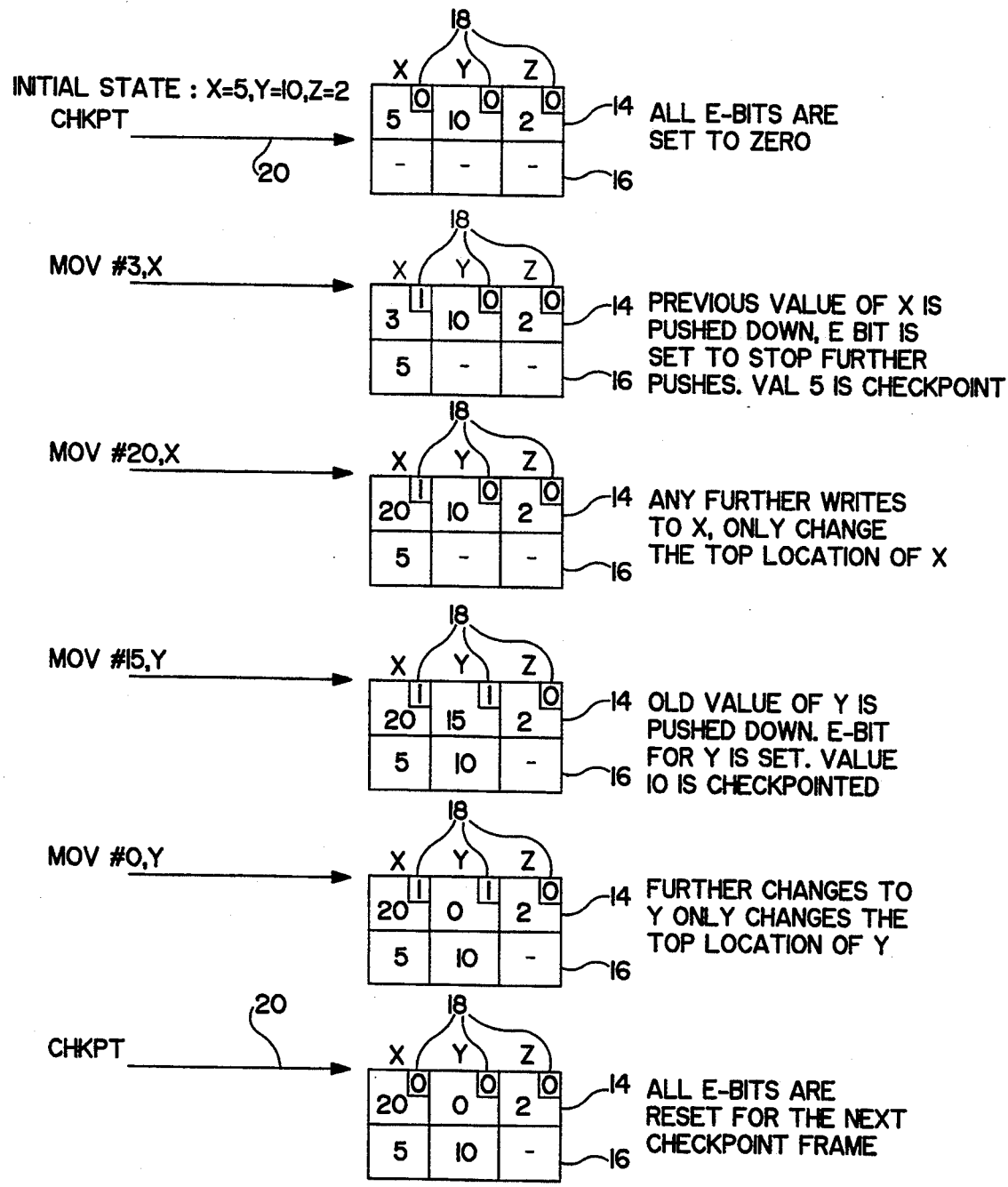
FIG. 2 is a series of schematic diagrams of the memory illustrating a checkpoint example.

Referring now to FIG. 2, there is illustrated the changing state of main memory 12 after each macro instruction. The variable Z has not changed in value and is therefore not checkpointed. Also, only the first change to X and Y are checkpointed. So, in the above scheme, if one wants to restore the system to the previous checkpoint, all one has to do is, restore the checkpointed values, i.e. set X to 10 and Y to 5.

Just as the target processor 10 supported a CHKPT instruction to inform the memory 12 that a block is being entered, the processor 10 also, preferably, supports an instruction RESTORE, that informs the memory 12 to restore all locations to their values at the beginning of the block. The memory 12 as described above, could therefore act as a base for supporting a high-level UNDO facility.

Supporting multiple roll-backs would necessitate checkpointing the modifications within each block. Such a facility can be implemented by connecting a checkpoint processor, as illustrated in FIG. 1, to the bottom layer 16 of memory. The checkpoint processor checkpoints the bottom locations of all those elements whose E-bit is set in a separate memory or recording storage or by an extension of the stack as described with reference to FIG. 3.

Because of the two layers 14 and 16 in the memory hardware 12, the checkpoint processor can access the bottom layer 16 without perturbing the target processor's access to the top layer 14. Consequently, an asynchronous and non-intrusive checkpointing facility is provided by using the bi-level memory 12 described above.

An interface necessary to use the two-level memory 12 described above includes a CHKPT line 20. The two-level memory 12 requires the CHKPT line 20 which, when activated, clears the E-bits 18 of all locations. This line is normally activated by the target processor 10.

The interface also includes RESTORE line (not shown). This is also a line on the chip of the memory 12 used by the target processor 10 to indicate to the memory 12 that a roll-back is desired. If this line is asserted, the memory 12 performs a single roll-back by reverse pushing all elements whose E-bit 18 is set.

Finally, the interface includes a READY line (not shown). The two-level memory 12 requires a ready line to indicate to other units connected to it that it has completed a roll-back. Typically, the target processor 10 executes a RESTORE instruction and waits for the memory 12 to activate so that the processor 10 can continue with the target program.

Of course, other interface lines may be necessary depending on the exact application where the memory 12 is used. As an example, if this memory 12 is used in applications where a periodic checkpoint facility is desirable, then, the memory 12 would have to be dual-ported for simultaneous access by the checkpoint processor. Alternatively, some other applications may require the roll-back facility to apply to only a range of locations (e.g., segments). The interface would then need a facility to MARK BEG (mark the beginning address) and a MARK END (mark the END address) of the desired region. The RESTORE instruction would then restore all locations lying in the specified address range.

Figure 3:
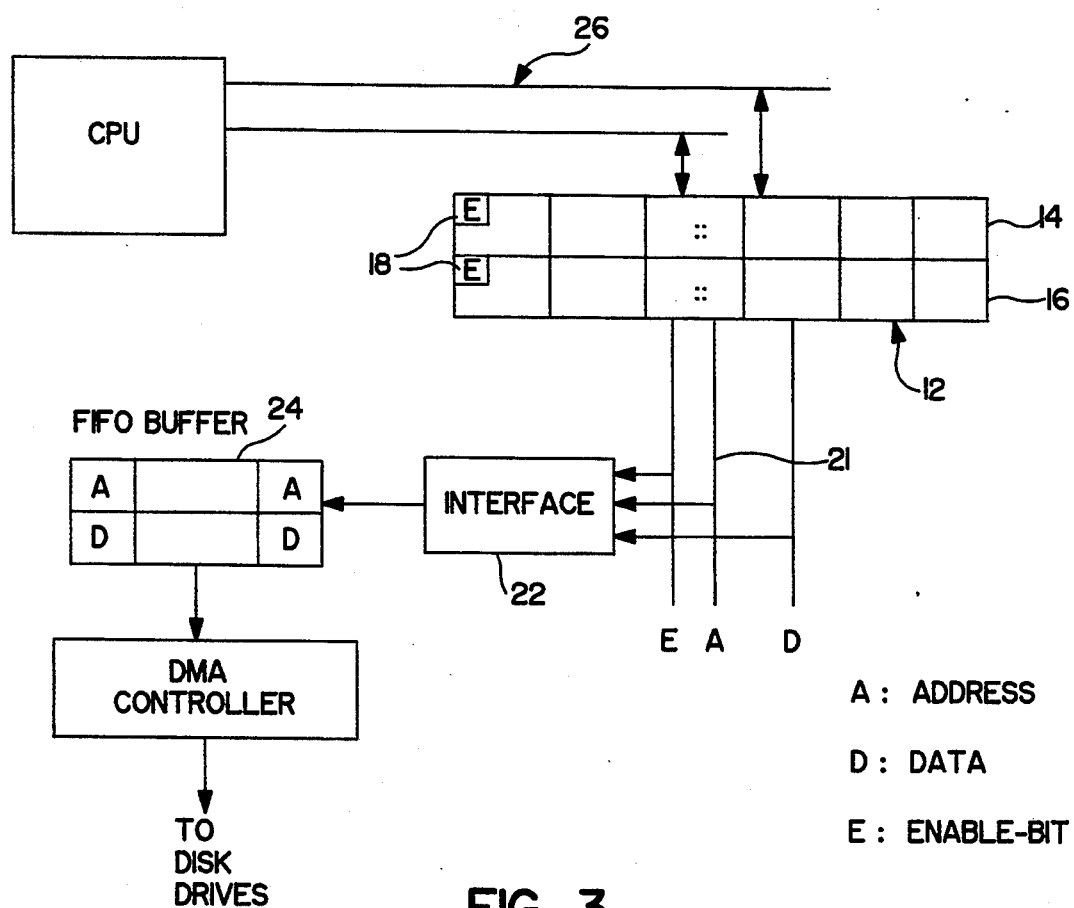
FIG. 3 is a schematic diagram of hardware for use in checkpointing.

Referring now to FIG. 3, there is illustrated a method of how the auxiliary or checkpoint processor stores the changes indicated by the E-bit 18 in the two level memory 12, onto the stable storage. An obvious approach is to have the auxiliary processor examine the E-bit 18 of each location and store the values of those locations whose E-bit 18 is set. This, however, is very time consuming since many of the E-bits 18 would be zero and the auxiliary processor would be wasting its time examining each of the E-bits 18.

An alternative solution which results in a more efficient (time-wise) checkpoint can be obtained by modifying the operation of the two-level memory 12 as follows.

First, an E-bit 18 is maintained for each location in the lower layer 16 also. On each write to memory 12, if the E-bit 18 is set, then the data part of the memory 12 is not pushed (as before). However, the value of the E-bit 18 is pushed down one layer always. Thus, the E-bits 18 on the lower layer 16 always reflect the previous value of the E-bit 18 in the higher level 14.

On each write to the memory 12 immediately after the value is written into the higher layer 14, the contents of the lower layer 16 of the corresponding location are put out on an A-bus 21 as shown in FIG. 3.

An interface 22 between the auxiliary processor and the A-bus 21 checks if the value for E-bit 18 on the corresponding line on the A-bus is 0. If it is, then the address and data bus contents of the A-bus 21 are loaded onto a FIFO 24. A 0 on the E-bit 18 means that this is the first change to the location after a checkpoint instruction and therefore the value of the location must be checkpointed.

The auxiliary processor keeps reading entries of the FIFO 24 and storing them onto a disk.

Figure 4:
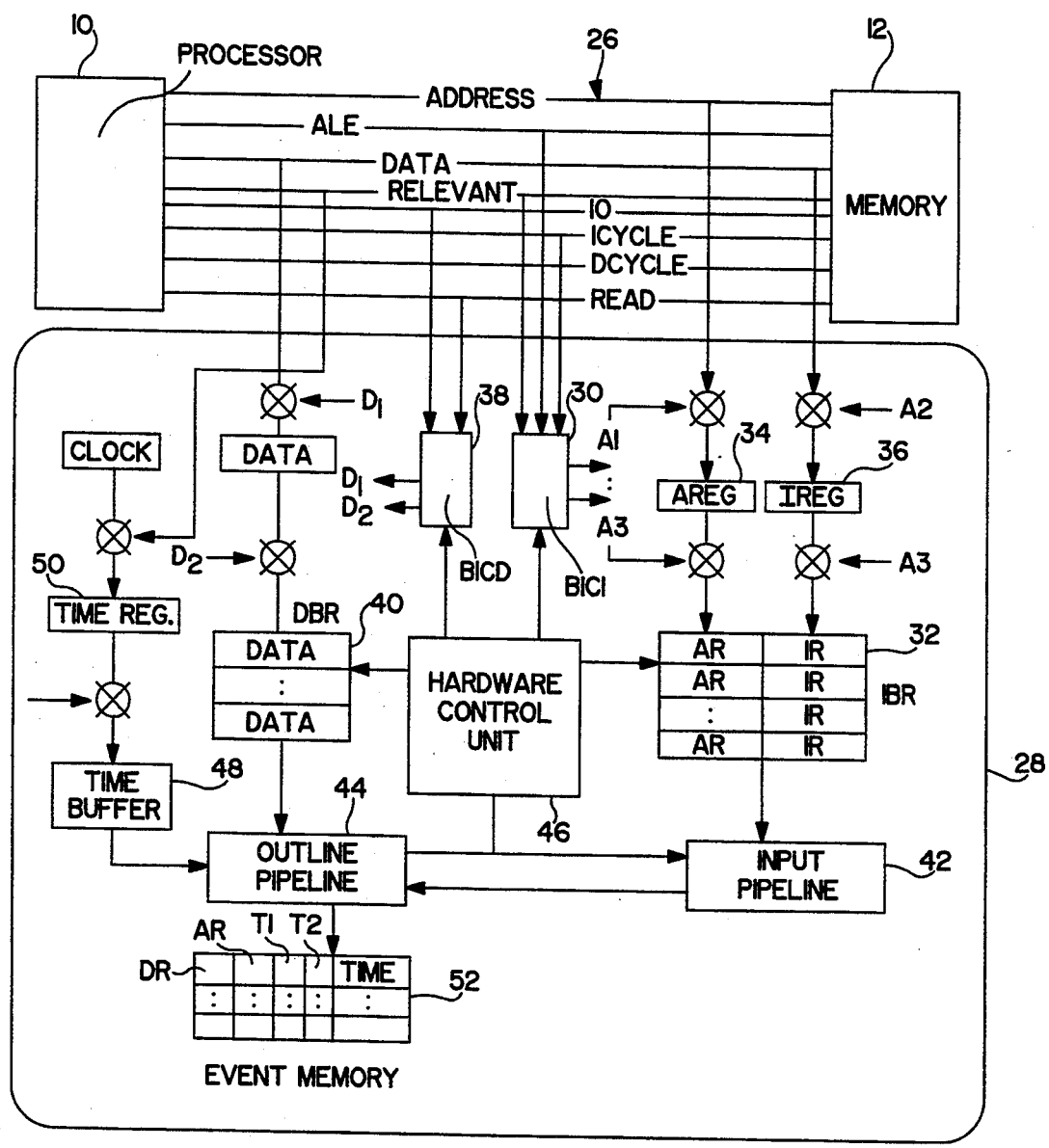
FIG. 4 is a schematic diagram of monitoring hardware for use on a bus connecting the processor and memory.

Given that the target program must be monitored at the machine instruction level, non-intrusively, the only place where the activity about the processor 10 can be inferred is by watching the CPU-Main memory bus, generally indicated at 26 in FIG. 4. This monitoring, in combination with the previously described check pointing strategy must be done in order to debug the software.

By way of background, a typical instruction execution goes through the following phases: (1) Instruction Fetch Phase: The instruction is fetched from main memory 12 over the bus 26; (2) Decode Phase: The instruction is decoded to determine if it requires any operands to be fetched from memory 12. If so, the operands are fetched from memory 12; and (3) Execute Phase: The instruction is executed and the results stored appropriately.

All the above steps are carried out in strict sequence, i.e. there is no overlapping between the phases. An instruction that is fetched from memory 12 is always executed. External interrupts are not acknowledged until the execution of the current instruction is completed.

The bus signals shown in FIG. 4 are some of the more common lines in most bus architectures.

ADDRESS: are a set of lines, which collectively specify an address. The target processor 10 uses these lines to access a particular location in memory 12.

ALE: Address Latch Enable

This is a line driven by the processor 10 to indicate (to memory 12) the validity of the contents of the address lines.

DATA: These are a set of lines that can be driven either by the processor 10 or by the memory 12. When driven by the processor 10, the memory 12 stores the contents of these lines into the location identified by the address lines. When driven by memory 12, they indicate the contents in memory 12 of the location addressed by the address lines.

READ/WRITE: This line is used to indicate the direction of data transfer. If memory 12 is being accessed for read it is asserted. If memory 12 is being accessed for write, it is not asserted. If memory 12 is not being accessed for either read or write, it is usually tri-stated.

ICYCLE: This line is driven by the CPU 10 to indicate the state it is in. Usually the processor 10 goes through three basic phases. The instruction fetch phase, data fetch phase and execute phase. The ICYCLE line is asserted during the instruction fetch phase.

DCYCLE: This line is similar to the ICYCLE line described above. It is asserted by the CPU 10 to indicate that it is in the data fetch phase.

IO: In an I/O mapped system, there is a need to differentiate the memory address space from the IO address space. This line is driven by the processor 10 to indicate that the contents of the address line belong to the IO address space as opposed to the memory address space.

RELEVANT: This is actually a part of the data bus 26. The compiler tags certain instructions as relevant by setting a bit (reserved for this purpose) in the opcode field of the instruction. When an instruction is being fetched this bit will be transmitted onto a specific line on the data bus 26. This line is called the relevant line. It can be driven by either the memory 12 alone or both the processor 10 and the memory 12. In other words, it is wire-ored between the processor 10 and the memory 12.

During the following discussion, it is assumed that the underlying machine is a RISC-type architecture, with the following features:

All instructions are fixed-length instructions. The length of the instruction is no more than the width of the data bus 26.

The machine is a load-store architecture. Every machine instruction has at most one memory operand.

Operands for an instruction are fetched only after all the operands for the previous instructions have been fetched.

In machines that have an on-chip instruction pipeline, there is no shuffling of instructions within the pipeline, i.e., it is assumed that instructions are NOT executed out of order.

Input/output are accomplished through explicit I/O instructions, i.e. the system is I/O mapped (as opposed to memory mapped). The system does not have a DMA capability. The ISR does not share registers with the interrupted thread, i.e. all registers are saved before switching the context to the ISR.

No on-chip timer i.e. it is assumed that the timer is an off-chip I/O device.

FIG. 4 shows the organization of the monitored hardware and the sample target architecture. All the components within the darkened rectangle with rounded edges are collectively referred to as monitoring hardware 28 and together accomplish the task of logging the sequence of relevant instructions- The purpose of each of these components is described hereinbelow.

BICI: Bus Interface Controller for instructions 30

This component is a hard-wired controller that controls the transfer of information between the bus 26 and an instruction buffer 32 (IBR). In particular, it strobes in the contents of the ADDRESS and DATA lines, as shown in FIG. 4, for every relevant instruction that is fetched from memory 12. The ADDRESS and DATA lines are strobed into AREG 34 and IREG 36, respectively, and subsequently strobed into IBR 32. Input to BICI 30 is through three lines on the bus 26, namely, the RELEVANT line and the ICYCLE line and the ALE line. The ICYCLE line, when active, indicates that the memory 12 is currently being accessed to fetch an instruction (as opposed to data). During an ICYCLE, an asserted RELEVANT line indicates that the instruction currently being fetched is relevant. An ALE line on the other hand indicates that the address on the ADDRESS lines is valid.

The BICI 30 is therefore responsible for sensing relevant instructions being fetched by the target processor 10 and logging them into the instruction buffer 32 along with their addresses. Only relevant instructions are logged into the instruction buffer 32.

BICD: Bus Interface Controller for Data 38

This component is similar to BICI 30 described above except that it interfaces the DATA lines to the Data buffer (DBR) 40, as shown in FIGURE 4. Transfer from the Data lines on the bus 26 to the DBR 40 is accomplished by activating control signals D1 and D2 appropriately.

It is necessary to trap only input data for purposes of subsequent replay (input data is data that is not generated by another instruction in the program i.e., it is data that is read from the external environment). BICD 38, therefore, traps only I/O reads (all other non I/O reads will be reproduced anyway during replay). The BICD 38 asserts D1 and D2 depending on the two lines IO and READ. The target processor 10 asserts the IO line whenever it executes an Input/output instruction (the system is IO mapped by assumption). The BICD 38 therefore asserts D1 whenever an I/O read is in progress. The data on the data bus 26 during this period corresponds to the input to an input instruction. The input to an input instruction is relevant and must therefore be trapped for reproducing the same value during the subsequent replay phase.

IBR: Instruction Buffer 32

This component stores all the relevant instructions fetched by the target processor 10 from memory 12. Every instruction fetched from memory 12 is executed (i.e. there is no instruction look-ahead facility). Therefore all instructions within the IBR 32 are logged into memory. They are not directly logged into memory from IBR 32, because certain instructions require associated input data to be logged along with them. The instructions from IBR 32 are therefore passed through various other components before being logged into memory, including input/output pipelines 42 and 44, respectively, which are described below.

Input Pipeline 42

As shown in FIG. 4, instructions and their corresponding data are separated into two different buffers, namely, the IBR 32 and the DBR 40, respectively. The separation is done because that's how the target processor 10 operates, i.e., it separates the instruction fetch phase from the data fetch phase. There are certain relevant instructions which require logging the instructions along with the associated data, (namely, INPUT actions). Before logging the sequence of relevant instructions into memory, the INPUT actions in IBR 32 are associated with their corresponding DATA in DBR 40. The input pipeline 42 is a component that appends tags to entries in IBR 32 that differentiates instructions within the IBR 32, that require an associated data item (from the DBR 40) before being logged into memory from those that don't. This component is internally pipelined and hence the name.

Output Pipeline 44

This component decodes the tags set by the INPUT PIPELINE and associates appropriate entries within the DBR 40 with those in IBR 32 and logs them into event memory.

Figure 5:
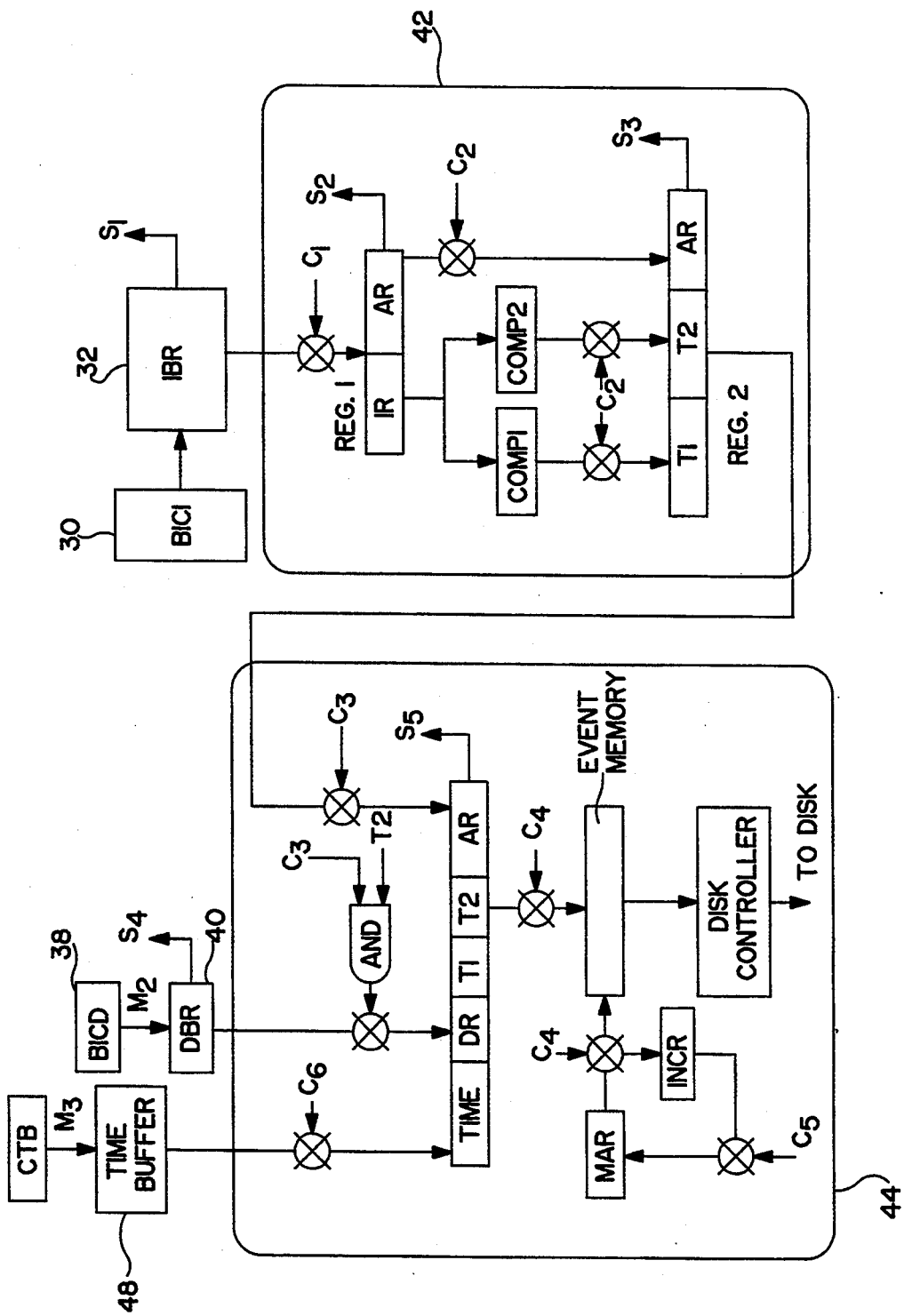
FIG. 5 is a schematic diagram illustrating the organization of input and output pipelines of the monitoring hardware.

Referring to FIG. 5, the instruction and data buffers 32 and 40, respectively, are directly loaded from the bus 26. Each entry within the instruction buffer 32 consists of a tuple (AR, IR), i.e., the address of the instruction and the actual instruction. This tuple is then directed to a comparator via a register.

Registers placed in between functional units hold intermediate results and allow parallelism between the units. The data path between the instruction buffer 32 and register 1, as shown in FIG. 5, is controlled by a control signal $C_1$. The control signals $C_1$, $C_3$ and $C_5$ can be activated at the same time since they control independent data paths (as opposed to say $C_1$ and $C_2$). As a result, multiple data transfers can take place concurrently, thus speeding up the monitoring activity.

Only relevant instructions (determined by the appropriate bit in the opcode field) are logged into the instruction buffer 32. All other instructions are discarded. After leaving the IBR 32, the pair (AR,IR), is routed to a comparator unit comprising comparators COMP1 and COMP2. COMP1 checks if the instruction is a CHKPT instruction and the other checks if the instruction is an input instruction. CHKPT instructions need to be identified in order to delimit the sequence of relevant instructions occurring within a checkpoint frame. Input instructions must be identified in order to associate entries within the data buffer with instructions in the instruction buffer 32.

The target processor 10 operates in three distinct phases. They are the instruction fetch phase, the operand fetch phase and the executive phase. For a given instruction the three phases occur in strict sequence, because only after the instruction is fetched can the operand phase begin. Similarly, only after the operands are fetched the execution phase can begin.

Data read during the operand phase is captured in DBR 40 (every read during this phase is not captured, only external reads are) and instructions fetched during the instruction fetch phase are captured in IBR 32 (here also every instruction fetched is not captured). Since the instruction and its associated input data have been separated, there is a need to join them again before logging the instruction. The joining need be done only for input actions (because the input to these actions is potentially irreproducible, since the input is an external operand). From the point of view of replaying a program, all other relevant instructions can be logged without their associated operands (because those operands are produced by other instructions in the program and are therefore reproducible).

Every input instruction in the IBR 32 has an associated data item in the DBR 40 (this is because every instruction that is fetched has to be executed and therefore has to have all its operands fetched). Also, since each instruction has at most one memory operand, the K-th data item (chronologically) within DBR 40 is associated with the K-th input action in the IBR 32. The algorithm for associating instructions in IBR 32 with data items in DBR 40 is relatively simple. Each time the instruction read (by the input pipeline 42) is an input instruction, it sets a tag. The output pipeline 44 decodes this tag and associates the first entry in DBR 40 (treated as a queue) with the instruction if the tag is set. If the tag is not set then it logs the instruction and leaves the DBR 40 as is. This tag is referred to as T2 (T2 is set if the instruction in IBR 32 is an input instruction).

As explained above, tag T2 helps identify, whether there is a need to store an input value along with the instruction address into the event memory. The output of the input pipeline 42 is of the form (T1,T2,AR), where AR is the address of the instruction. T1 is set to 1 if the instruction is a CHKPT instruction. The (T1,T2,AR) pair is next routed to a register before finally being logged into the event table. The data buffer 40 is read only if T2 is set as shown in FIG. 5. (T2 is "anded" with control signals $C_3$). Control signals $C_4$ and $C_5$ are used to store the instruction sequence into event memory. Since event memory is limited, its contents are transferred to disks via disk controllers.

The control signals of the input and output pipelines 42 and 44 as shown in FIG. 5 are as follows:

$C_1$: Control signal $C_1$ is generated by HCU 46. It is used to read the first entry in IBR 32 for processing by rest of the input pipeline 42. Note that once $C_1$ is turned off, IBR 32 and Reg. 1 are essentially disconnected.

$C_2$: After the entry in IBR 32 is strobed into REG. 1, the components COMP1 and COMP2 analyze the IR-art of the REG. 1 as shown in FIG. 5. Component COMP1 checks if the instruction is a CHKPT instruction. Knowledge of this instruction occurrence is required to delimit checkpoint frames as previously explained. COMP1 consists of a comparator that compares the opcode of IR to that of a CHKPT instruction. The output of COMP1 is either 1 or 0 depending in whether the instruction was a CHKPT instruction or not. Component COMP2 on the other hand, is also a comparator that checks whether the instruction IR is an input instruction or not. The output of COMP2 is a 1 if the instruction is an input instruction and a 0 otherwise. Control signal, $C_2$, activated by HCU 46, is used to strobe the outputs of the components COMP1 and COMP2 into REG. 2.

$C_3$: Control signal $C_3$ is used to strobe the output of REG. 2 into REG. 3. The registers are used to decouple the various components in order to enable parallel operation. More clearly, REG. 1 e.g., decouples IBR 32 from components COMP1 and COMP2. As a direct result, buffer management of IBR 32 can occur while COMP1 and COMP2 are processing an entry. The T2 is "anded" with $C_3$ to generate a control signal by reading DBR 40. T2 is set to 1 if the instruction is an input instruction.

Also, every input instruction has a corresponding data entry with DBR 40 that corresponds to it. Hence, if T2 is 1, the entry in DBR 40 that corresponds to it is read and the whole REG. 3 is logged into event memory. The T2 shown to be "anded" with $C_3$ comes from REG. 2.

$C_4$: Control signal $C_4$ is used to actually write into event memory. The MAR component is the Memory Address Register, used to address the event memory. Each time an entry is logged into event memory, MAR is incremented appropriately to point to the next available memory location in event memory.

$C_5$: Control signal $C_5$ is used to strobe in the new incremented MAR value back into MAR.

Time Buffer 48:

This component maintains the times at which the relevant instructions were fetched from memory 12. Each time a relevant instruction is fetched from memory 12, a clock read is initiated as shown in FIG. 4. The output of the clock read is logged into the time buffer 48 via a time register 50. Each time a relevant instruction is logged into event memory, the corresponding fetching time of the instruction is also recorded along with the instruction.

Event Table or Memory

This is the event memory that contains the sequence of relevant instructions and their associated data.

Hardware Control Unit 46

The hardwired controller 46 controls all transfer of information between all of the other components of the monitoring hardware 28.

The controller or control unit 46 generates the control signals previously mentioned. The controller 46 also takes care of the timing constraints between the control signals. For example, control signals $C_1$ and $C_2$ cannot be activated simultaneously. At the same time, however, it is desirable to activate as many control signals as possible in order to maximize parallelism.

Figure 6:
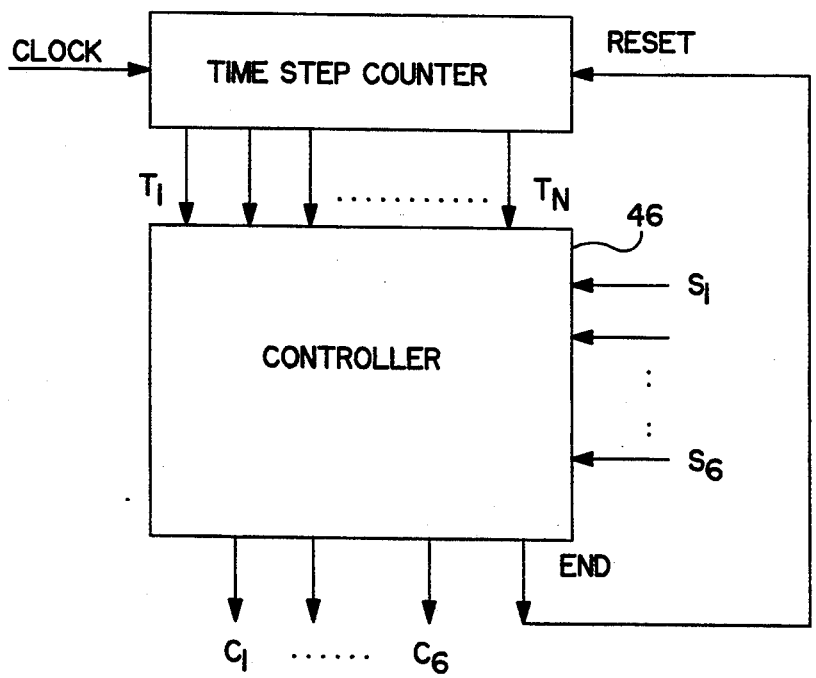
FIG. 6 is a schematic diagram of a hardware control unit of the motoring hardware.

The controller 46 operates in time cycles. Each time cycle consists of many discrete time steps. It generates a subset of control signals during each time step. The duration of each time step depends on the control signals during the corresponding time step. As shown in FIG. 6 the time steps are defined by a time step counter. The duration of each time step is an integral multiple of the basic clock feed to the time step counter. The time step counter, shown in FIG. 6 is an encoder with N output lines (corresponding to an N-step counter). During each time step, exactly one of the N output lines is activated. Depending on the time step $(t_1, \ldots T_n)$ and the status signals $s_1 \ldots s_n$, the controller decides which control signals to activate. The control signal END is a special signal that terminates the current time cycle and begins a new time cycle. An END control signal is used to reset the time step counter so that a new time cycle can be initiated.

Since the control signals generated during each time step is fixed, the hardware for generating the control signals is relatively simple. The control signals and the time step during which they are activated are as follows:

Time Step 1 ($T_1$); $C_1$, $C_3$ and $C_5$.

Time Step 2 ($T_2$); $C_2$, $C_4$, $M_1$ and $M_2$ (signals to manage the FIFO buffer (instruction and data buffers)).

Time Step 3 ($T_3$); END.

Hardware for generating the signals is very simple and consists of simple AND gates. $C_1$ is derived by "and"ing the signals $T_1$ and the status signal $s_1$.

Apart from generating control signals that control the data path, the controller 46 must also generate signals that perform buffer management e.g. advancing all the entries in the instruction and data buffers 32 and 40, respectively. The signals labeled as $s_1$, $s_2$ etc in FIG. 5 indicate the status of the corresponding units to the control unit 46. The status during a particular clock cycle indicates if the corresponding unit has valid data during that cycle. For example, if the instruction buffer is empty during a particular clock cycle, then the control unit does not generate the control signal $C_1$ during that cycle.

In general, one element of monitoring the program concerns relevance. Because the level of abstraction at which the monitoring should occur is the level where instructions are executed without being interrupted, the machine instruction level is chosen as the level to monitor. Further, machine instructions determine the actual behavior of the program. Therefore, they are relevant.

Because one of the goals of rolling-back and replaying the program when an error occurs is to have an identical replay, the behavior of the replay is also of importance.

The behavior of a program is characterized by the behavior of its objects, where an object is anything declared by the program that can appear as an operand in a machine instruction. Behavior can be classified into three broad categories: non-real-time, weak real-time and strong real-time. For non-real-time, the replayed object should have the same sequence of values as they did in the original execution. However, for real-time systems, because timing constraints are often present, replayed objects should exhibit identical value and time behavior as they did in the original execution.

Because of the varying degrees of timing constraints between non-real and real-time systems, each behavior category requires certain relevant instructions for identical replay of a program. As systems move on the spectrum from non-real to real-time, more instructions need to be declared relevant in an effort to avoid scheduling errors.

Relevant instructions can be categorized in terms of when their relevancy can be determined. While some instructions can be declared relevant at compile time (i.e. I/O), others can be declared relevant only at run-time (i.e. instructions executed upon receipt of an interrupt). The former instructions will have a bit in their opcode (that is specifically used for relevancy) set by the compiler. The latter instructions will be labeled relevant by the processor by asserting a line of the data bus (that is specifically used for relevancy). The invention then monitors the program execution, and methodically ascertains which instructions are relevant through opcode/data bus evaluation, and stores them in a buffer for later replay. A more detailed discussion of relevancy and behavior can be found in Banda *"Architectural Support for Debugging Real-Time Software"*, Technical Preliminary Report, Department of EECS, University of Michigan, Ann Arbor, December 1987.

The monitoring scheme discussed to this point can log the sequence of non real-time relevant instructions. Specifically, the scheme can detect and log the following relevant instructions:

Shared actions: The machine instruction corresponding to a shared action has the bit in the opcode field, reserved for indicating relevancy, set to 1. Consequently, when the instruction is fetched over the bus 26, BIC 30 strobes it into the IBR 32, as described earlier.

Input/Output actions: These are actions corresponding to input/output instructions. These instructions also have the appropriate bit in the opcode field (reserved to indicate relevancy), set to 1. These are also trapped by BICI 30 and strobed into the IBR 32 when they are fetched from memory 12. The input value read corresponding to the input instructions is strobed into the DBR 40 by the BICD 38, as described earlier.

There are, however, actions that cannot, in general, be determined to be relevant at compile time. The scheme described up to this point cannot, therefore, log the sequence of these instructions. These are terms Dynamic relevant actions, as their relevancy can only be determined at run-time.

An entry action corresponds to the execution of the first instruction (belonging to the application program) after a context switch. A context switch occurs in response to an interrupt. One of the following things can happen as a result of the interrupt:

If the interrupt is an external interrupt (i.e. an interrupt for which the programmer has written the ISR), then the first instruction (of the application program) will be the first instruction within the ISR. This particular instruction is detectable by the compiler and could therefore be statistically tagged to be relevant.

If the interrupt is an internal interrupt (i.e. an interrupt for which the programmer has not written the ISR, e.g. the timer-interrupt), then the entry action is not evident. Typically, the ISR would choose one of the processes in the ready queue and transfer control to that process. Execution within that process would continue from the instruction immediately after the one that was last executed. The last instruction executed within the ISR would therefore be equivalent to (if not identical to) a JUMP to the appropriate address within that process. (See FIGS. 7a and 7b).

The instruction fetched after the last instruction executed within the ISR is the instruction to be detected because that is precisely the entry action that needs to be trapped into the IBR 32. While fetching the instruction immediately after the last instruction within the ISR, if the relevant line is asserted, then the mechanisms for logging status relevant instructions will take over and log this instruction. To the monitoring hardware 28 it appears as if this were a static relevant instruction.

Figure 7A:
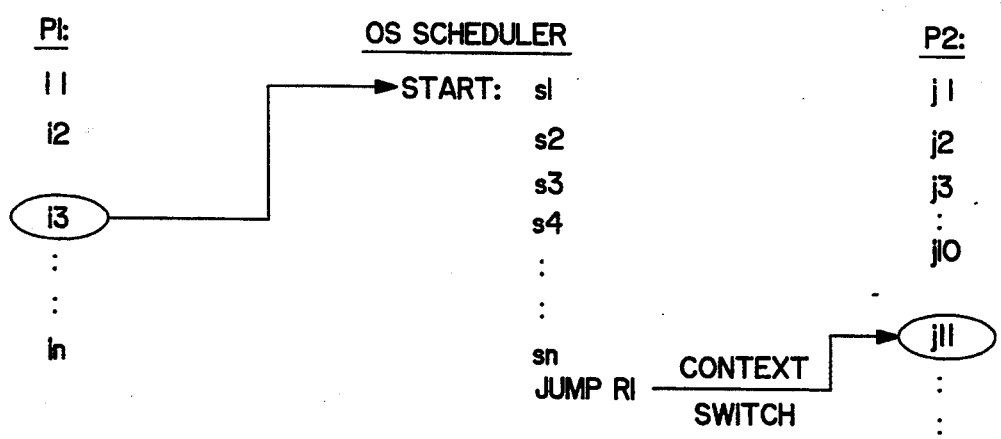
FIGS. 7a and 7b are diagrams of two processes which illustrate the detection of dynamic relevant instructions.
Figure 7B:
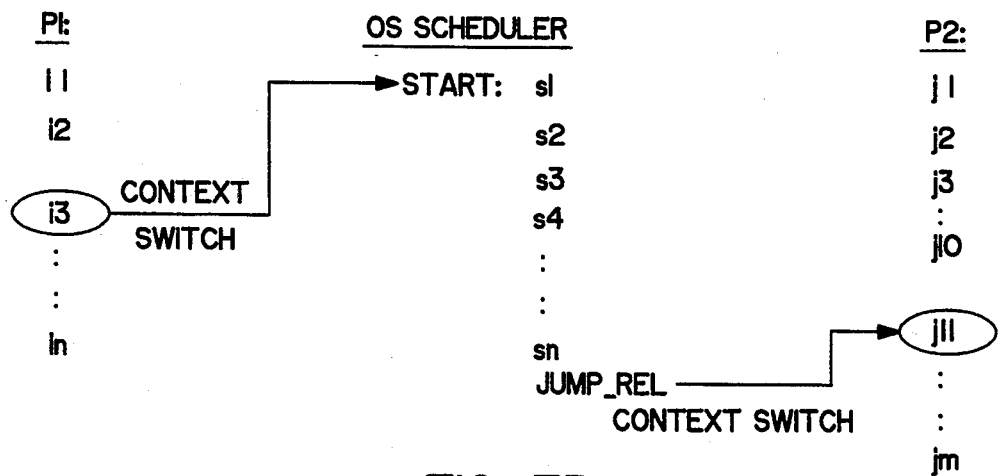

Referring to FIGS. 7a and 7b, P1 and P2 are two processes. A timer interrupt that occurs while P1 is executing, forces the control to be transferred to the OS Scheduler which then decides to transfer the control to process P2, through a JUMP instruction as shown in FIGS. 7a and 7b.

Since the processor 10 knows when this instruction is being fetched, it asserts the relevant line. Thus the relevant line on the bus is wire-ored between the processor 10 and memory 12. Thus the mechanism involves using a special instruction as the last instructions in the ISR that informs the processor 10 that the subsequent instruction that is fetched from memory 12 is relevant. The instruction fetch unit within the processor 10 then asserts the relevant line corresponding to the subsequent instruction fetch.

OPERATION

First, the programmer writes the program in the form of a number of parallel processes sharing a common global memory. During compilation, the compiler marks certain instructions as relevant (depending on whether their domain includes a shared object). The programmer also places checkpoints within the code at places he/she thinks appropriate. During execution, in phase 1, the processors execute the processes according to some scheduling policy.

While the target processor 10 fetches instructions from memory 12, the monitoring hardware 28 "snoops" on the bus 26 and logs the sequence of relevant instructions into an event table 52. The activity of snooping does not in any way perturb the target processor 10.

The processor 10 on encountering a CHKPT instruction, cues the checkpoint processor 10 to initiate checkpointing activity. It then transmits its registers over the bus 26 to memory 12. After setting all its E-bits 18, the checkpoint processor 10 then asserts the "resume" signal, indicating to the target that it can now proceed with its execution. The checkpoint processor 10 then performs the actual task of checkpointing.

During the first phase, upon encountering an error, the user restores the state of the system to a previous CHKPT and begins the replay under the control of the monitor. The monitor refers the event table 52 and constrains the execution to follow the sequence dictated by the event table 52. The user can of course apply most of the techniques used in sequential debugging like conditional breakpointing, examining stats of variable etc. to verify his notion of what the program is doing. Modifying a variable needs special care. For example, modifying a variable could alter the flow of control and the sequence of relevant instructions, which would then nullify the event table 52. A user, therefore, can modify only those variables that do not result in an alteration in the execution sequence of relevant instructions.

The method and system of the present invention provide numerous advantages. For example, non-invasive monitoring and debugging programs can be performed with the novel memory architecture that is used to checkpoint the memory non-intrusively.

In summary, the architectural support necessary to perform non-invasive debugging in uniprocessors without pipelining or caching are as follows:

Support for Monitoring
  Compiler support in the form of tagging all static relevant instructions.
  A Relevant Line on the bus that is wire-ored between the CPU 10 and memory 12 for detecting entry actions.
  A new machine instruction JUMP REL. for triggering a subsequent instruction fetch to be relevant.
Support for Checkpointing
  A 2-level memory 12 as described.
  A checkpoint line on the bus 26, used by the target processor 10 to indicate to the checkpoint processor to start a new checkpoint frame.
  A Resume line on the bus, used by the checkpoint processor to indicate to the target processor 10 that it is ready to start a new checkpoint frame.

The invention has been described in an illustrative manner and, it is to be understood that, the terminology which has been used is intended to be in the nature of words of description rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. A method for storing the state of a computer system for recovery at a later time, the computer system including a target processor programmed with a target program having a plurality of instruction blocks, each of the blocks having at least one variable associated therewith and a memory having first and second levels, each of the levels having a plurality of locations, the first level of memory being connected to the target processor, the method comprising the steps of:

storing a first value of the at least one variable in a first location of the first level of memory;

generating a first signal indicating the beginning of an instruction block;

transferring, without interrupting execution of the instruction block, the first value of the at least one variable to a corresponding second location in the second level of memory from the first location in the first level based on the first signal, the first and second locations of the first and second levels, of memory, respectively, defining a push down stack having a push down mode and a locked mode, the first value being transferred to the second location in the push down mode, the value of the at least one variable in the second location of the second level remaining unchanged in the locked mode during the execution of the instruction block, the value of the at least one variable being allowed to change in the first location of the first level during execution of the instruction block and wherein the first value of the at least one variable contained in the second location of the second level is utilized for recovering the state of the computer system to that state at the beginning of the instruction block; and storing a second value of the at least one variable in the first location of the first level of memory, the second value being different from the first value whereby the second level of memory reflects the state of the computer system at the beginning of the instruction block;

whereby the second level of memory reflects the state of the computer system at the beginning of the instruction block.

2. The method as claimed in claim 1 further comprising the step of generating a second signal to re-transfer the first value of the at least one variable from the second location to the first location of the first level of memory.

3. The method as claimed in claim 2 further comprising the step of generating a third signal to indicate the completion of the re-transfer of the first value of the at least one variable so that the target processor can continue execution of the target program.

4. A computer system for storing a state of the computer system for later recovery, the computer system including:

a processor programmed with a target program having a plurality of instruction blocks, each of the blocks having at least one variable associated therewith;

a memory connected to the processor, the memory having first and second levels, each of the levels having a plurality of locations, the first level of memory being connected to the processor;

a first location of the first level of memory for consecutively storing first and second values of the at least one variable, the second value being different from the first value;

a second location of the second level for storing recoverable values representing the state of the computer system at the beginning of the instruction blocks;

means for generating a first signal indicating the beginning of an instruction block;

means for transferring, without interrupting execution of the block, the first value of the at least one variable to a corresponding second location in the second level of memory from the first location in the first level based on the first signal, the first location of the first level and second location of the second level defining a push down stack having a push down mode and a locked mode, the first value being transferred to the second location in the push down mode, the value of the at least one variable in the second location of the second level remaining unchanged in the locked mode during the execution of the instruction block, the value of the at least one variable being allowed to change in the first location of the first level during execution of the instruction block and wherein the first value of the at least one variable contained in the second location of the second level is utilized for recovering the state of the computer system.

5. The system as claimed in claim 4 further comprising means for generating a second signal to re-transfer the first value of the at least one variable from the second location to the first location of the first level of memory.

6. The system as claimed in claim 5 further comprising means for generating a third signal to indicate the completion of the re-transfer of the first value of the at least one variable so that the processor can continue execution of the target program.

* * * * *

UNITED STATES PATENT AND TRADEMARK OFFICE
CERTIFICATE OF CORRECTION

PATENT NO. : 5,410,685
DATED : April 25, 1995
INVENTOR(S) : Venu P. Banda et al.

It is certified that error appears in the above-indentified patent and that said Letters Patent is hereby corrected as shown below:

On title page, Item [54], should read
--NON-INTRUSIVE METHOD AND SYSTEM FOR RECOVERING THE STATE OF A COMPUTER SYSTEM AND NON-INTRUSIVE DEBUGGING METHOD AND SYSTEM UTILIZING SAME--

Column 1, line 35 "A cross" should be --across--.
Column 6, line 7, after "block" insert --was--.
Column 9, line 8, "instructions" should be -- Instructions--.
Column 12, line 27, after "Memory" insert --52:--.

Signed and Sealed this

Thirty-first Day of October 1995

Attest:

BRUCE LEHMAN

Attesting Officer    Commissioner of Patents and Trademarks